No. 853,972. PATENTED MAY 21, 1907.
E. A. GROUT.
ARTIFICIAL BAIT.
APPLICATION FILED OCT. 17, 1906.
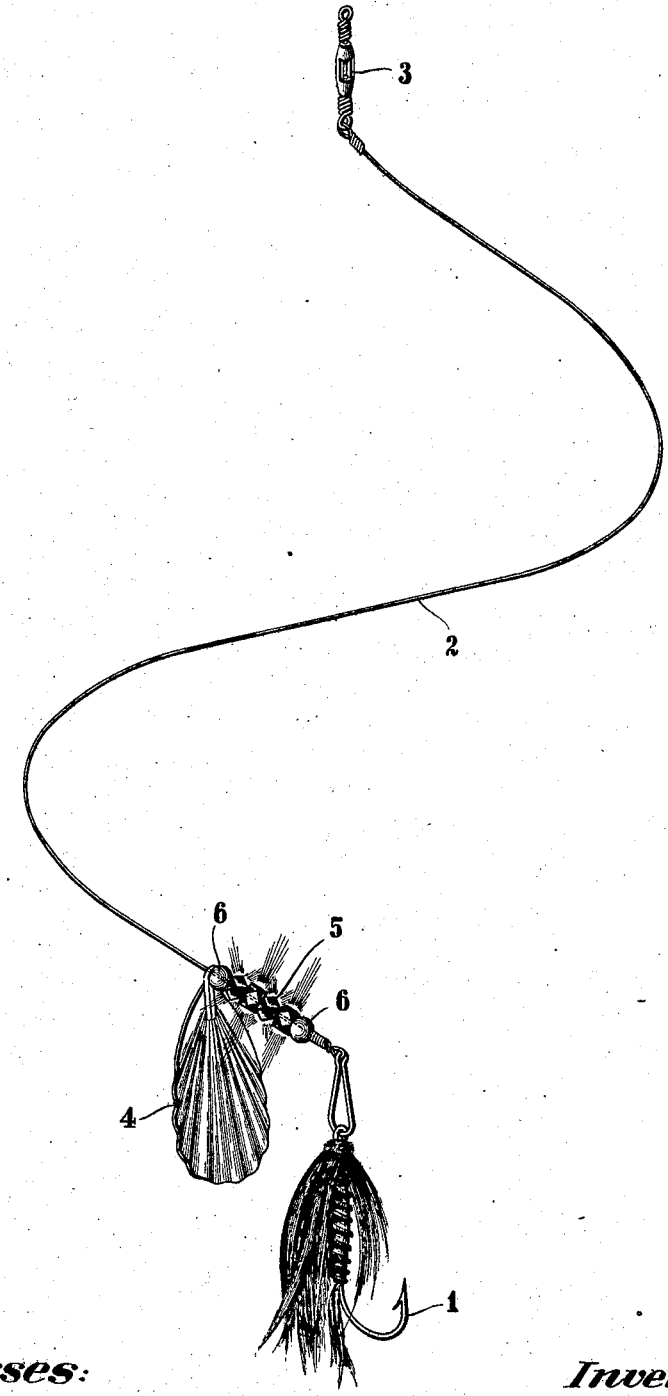

UNITED STATES PATENT OFFICE.

EDWARD A. GROUT, OF MEDFORD, MASSACHUSETTS, ASSIGNOR TO WILLIAM READ & SONS, OF BOSTON, MASSACHUSETTS, A FIRM.

ARTIFICIAL BAIT.

No. 853,972.  Specification of Letters Patent.  Patented May 21, 1907.

Application filed October 17, 1906. Serial No. 339,313.

*To all whom it may concern:*

Be it known that I, EDWARD A. GROUT, a citizen of the United States, residing at Medford, in the county of Middlesex and State of Massachusetts, have invented certain new and useful Improvements in Artificial Bait; and I do hereby declare the following to be a full, clear, and exact description of the invention, such as will enable others skilled in the art to which it appertains to make and use the same.

The present invention relates to an improvement in artificial bait.

The object of the invention is to produce an artificial bait of increased efficiency by reason of its peculiar attractive and seductive qualities and the invention consists of the device hereinafter described and particularly defined in the claims.

The drawing is a perspective view of a troll embodying the invention.

It has been discovered by the inventor that iridescent glass beads have an appearance in the water which either by reason of its simulation of live food, or other reasons, has a marked and striking attraction for certain kinds of game fish. This is apparently due to the iridescent character of the glass which gives it an opalescent appearance similar to that of some fish foods. The attractive character of the bead is much enhanced by making it polyhedral in form, which causes the beads to sparkle and flash and thereby render it visible to the fish at the greater distance. These beads particularly when used in connection with a spoon, have been found by experience to greatly increase the "killing" power of the bait.

In the drawing, the beads are shown as applied to a troll, comprising a feathered hook, 1, a wire leader 2, provided with the usual swivel 3, and a spoon 4, of approved form. The polyhedral iridescent beads 5 are interposed between the hook and the spoon, being strung on the leader, and plain round beads 6, preferably of contrasting color are added, one of such beads serving as a bearing for the loop of the spoon to rotate upon. The spoon in its rapid rotations throws flashes which transmit and reflect light in the form of opalescent gleams from their many facets producing a strikingly attractive effect.

It is preferred to use a wire leader 2 of helical form or some form other than straight which perhaps may best be generically defined as crooked because owing to the bends of the wire it causes the bait to dart from side to side as it is drawn through the water.

Having described the invention, what is claimed is:—

An artificial bait, comprising a hook and a lure consisting of an iridescent glass bead of polyhedral form adapted to emit opalescent gleams from its facets, substantially as described.

In testimony whereof I affix my signature, in presence of two witnesses.

EDWARD A. GROUT.

Witnesses:
HORACE VAN EVEREN,
FARNUM F. DORSEY.